United States Patent
Garcia, Jr. et al.

(10) Patent No.: US 7,168,738 B2
(45) Date of Patent: Jan. 30, 2007

(54) CHILD RESTRAINT SEAT DETECTION DEVICES

(75) Inventors: Romeo Joseph D. Garcia, Jr., Rochester Hills, MI (US); John R. Dolan, Woodhaven, MI (US)

(73) Assignee: General Motors Corporation, Detroit, MI (US)

( * ) Notice: Subject to any disclaimer, the term of this patent is extended or adjusted under 35 U.S.C. 154(b) by 330 days.

(21) Appl. No.: 10/687,905

(22) Filed: Oct. 17, 2003

(65) Prior Publication Data

US 2005/0082103 A1 Apr. 21, 2005

(51) Int. Cl.
*B60R 21/32* (2006.01)

(52) U.S. Cl. .................... 280/735; 180/268; 701/45

(58) Field of Classification Search ................ 280/735; 180/268; 701/45; 297/256.16
See application file for complete search history.

(56) References Cited

U.S. PATENT DOCUMENTS

| | | | |
|---|---|---|---|
| 5,468,014 A * | 11/1995 | Gimbel et al. .............. 280/735 |
| 5,690,356 A | 11/1997 | Lane, Jr. |
| 6,371,516 B1 * | 4/2002 | Miyagawa ................... 280/735 |
| 6,522,257 B1 | 2/2003 | Jakob et al. |
| 6,561,543 B1 * | 5/2003 | Hamada et al. ............. 280/735 |
| 6,846,012 B2 * | 1/2005 | Baskin et al. ............... 280/735 |
| 6,903,286 B2 * | 6/2005 | Kaijala et al. ............ 200/85 A |

* cited by examiner

*Primary Examiner*—Paul N. Dickson
*Assistant Examiner*—Toan C. To
(74) *Attorney, Agent, or Firm*—Laura C. Hargitt

(57) ABSTRACT

The presence of a child restraint seat on a vehicle seat is detected by movement of a pair of anchors from a first position to a second position when the child restraint seat is coupled with straps to the anchors. The anchors are pivotally or deflectively mounted on a cross bar which extends between side frame members within the back of the vehicle seat. Upon a sensor detecting the presence of the child restraint seat, an associated air bag is disabled so that the air bag will not be deployed against a child sitting in the child restraint seat if the car is in an accident. Upon removing the child restraint seat, the anchors return to the first position in which the sensor again enables the air bag for deployment because, in the absence of a child restraint seat, an occupant of the seat is more likely to be an adult than a child.

16 Claims, 6 Drawing Sheets

CHILD RESTRAINT SEAT DETECTION DEVICES

FIELD OF THE INVENTION

The present invention is directed to child restraint seat detection devices. More particularly, the present invention is directed to child restraint seat detection devices which notify an air bag controller that a child restraint seat is present on a vehicle seat in order to deactivate or slow deployment of an air bag.

BACKGROUND OF THE INVENTION

A child being carried by a child restraint seat can be subjected to relatively high impact forces upon deployment of an air bag against the child, whether the air bag is a front or side curtain air bag. Accordingly, it is suggested that children beneath a selected size and weight not be subjected to impact by air bags. In some vehicles, manual switches are provided to deactivate air bag deployment systems when a child restraint seat is occupied by a child. A driver or passenger can forget to operate the manual switch when a child is seated, or the air bag can be left in a deactivated mode when an adult is seated.

This has led to arrangements for automatically deactivating air bags when the presence of a child rather than an adult in a vehicular seat is detected. Currently, these devices respond to the weight of a person occupying a passenger seat, whether that person is an adult or a child, rather than responding to the mere presence of a child restraint seat. It has been found that some weight based suppression systems that are installed in the seat cushion of the right front passenger seats have difficulty correctly classifying Lower Anchorage and Tether for Children (LATCH) child restraint seats that are attached to the lower anchorages of the right front passenger set. The reason for this difficulty is the inability of the suppression system to detect the amount of load being applied by the attached child restraint seat to the set cushion resulting in added weight measurement to the suppression system. This misclassification occurs when this added weight equals the amount of weight that an adult occupant would apply while seated in the right front passenger seat. It is not currently realized that the mere presence of a child restraint seat in almost all cases precludes occupancy of the passenger seat by an adult, who is less likely to experience ill effects from an air bag impact than an infant or small child. Accordingly, there is a need in systems, such as LATCH child restraint seat systems, for detection devices which recognize the mere presence of a child restraint seat and use that recognition to deactivate or alter deployment speeds of airbags.

SUMMARY OF THE INVENTION

The present invention is directed to a device for detecting the presence of a child restraint seat when the child restraint seat is attached to a vehicle seat. The device comprises an anchor fixed with respect to the seat, the anchor having at least one coupler adapted to couple with a complementary coupler on a child restraint seat to retain the child restraint seat on the vehicle seat. The anchor is movable with respect to the seat and is biased to a first position with respect to the seat indicative of an absence of a child restraint seat coupled to the anchor. A position sensor is attached to the anchor for detecting movement of the anchor to a second position with respect to the seat, indicating a child restraint seat is coupled to the anchor. The position sensor is adapted to transmit a signal to an air bag controller disabling deployment of the air bag when the anchor is moved to the second position.

In another aspect of the invention, the second position is angularly off-set from the first position so that a tangential force on the anchor is required to move the anchor from the first position to the second position.

In a first embodiment of the invention the anchor is biased to the first position by at least one spring.

In one aspect of the first embodiment of the invention, the anchor is pivotally mounted with respect to the seat and rotates from the first position to the second position against the bias of the spring.

In accordance with a second embodiment of the invention, the anchor is resilient and is urged by its resilience to the first position, deflecting from the first position to the second position upon securing the child restraint seat thereto.

In still another embodiment of the invention, the seat includes a seat back frame to which the anchor is attached.

In still another embodiment of the invention, the anchor comprises an anchor bar extending along a cross bar disposed in the seat back frame, the anchor having two couplers at spaced locations thereon, each of which couplers latches with a complementary coupler on the child restraint seat that is attached to an adjustable strap. When under tension the adjustable straps apply force to the couplers moving the anchor from the first position to the second position, thereby signaling an air bag controller that a child restraint seat is present and that the air bag should not be deployed.

The present invention is further directed to a device for detecting the presence of a child restraint seat when the child restraint seat is attached to a vehicle seat having a seat back frame, the seat back frame including a pair of horizontally spaced side frame members. The device comprises a cross bar having first and second ends, the first and second ends being fixed to the pair of side frame members. An anchor comprising an anchorage bar is mounted on the cross bar, the anchorage bar having first and second couplers thereon for latching with corresponding couplers on the child restraint seat to retain the child restraint seat on the vehicle seat. The anchorage bar is biased to the first position, but movable with respect to the cross bar from a first position indicative of the absence of a child restraint seat to a second position, indicative of the presence of a child restraint seat. A position sensor is attached to the anchorage bar for detecting movement of the anchorage bar from the first position to the second position. The position sensor is adapted to transmit a signal to an air bag controller when moved to the second position indicating the presence of a child restraint seat on the vehicle seat, wherein the air bag controller either disables the air bag or adjusts a weight measurement to compensate for weight imposed by the attached child restraint seat.

In an aspect of the aforedescribed invention, the anchorage bar is pivoted on the cross bar and is biased to the first position by at least one spring.

In still a further aspect of the aforedescribed invention, the anchorage bar is resilient and fixed to the cross bar for deflection from the first position to the second position.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
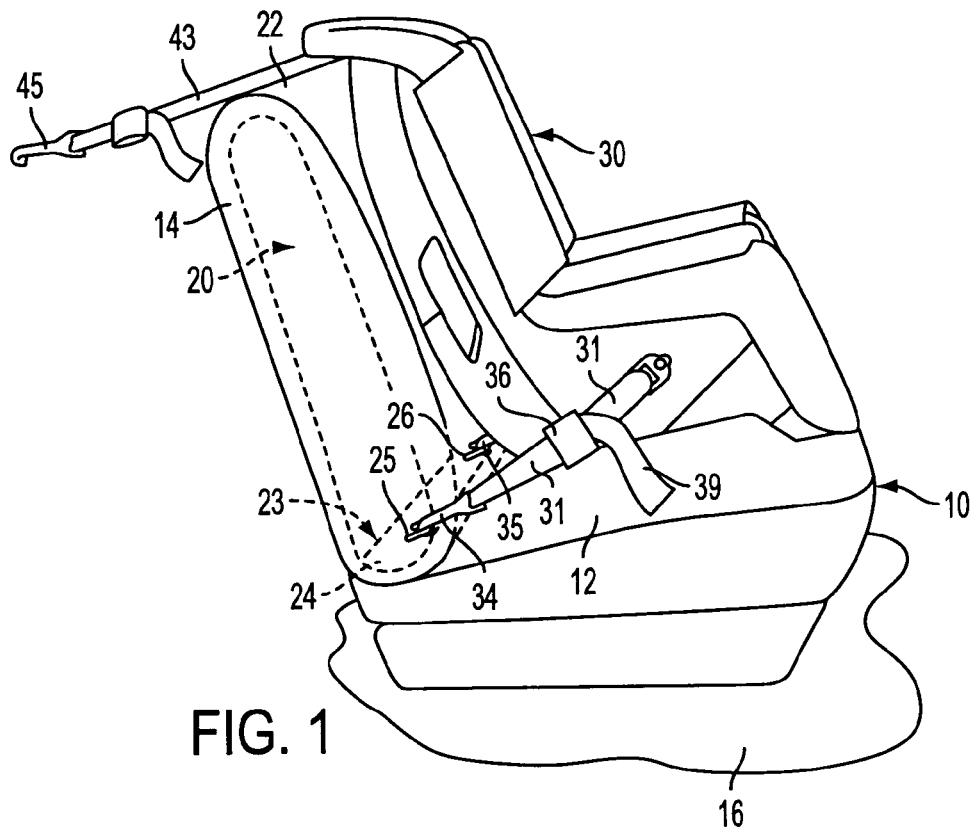
FIG. 1 is a side view showing a forward facing child restraint seat being mounted on a vehicle set in accordance with the principles of the present invention.
Figure 2:
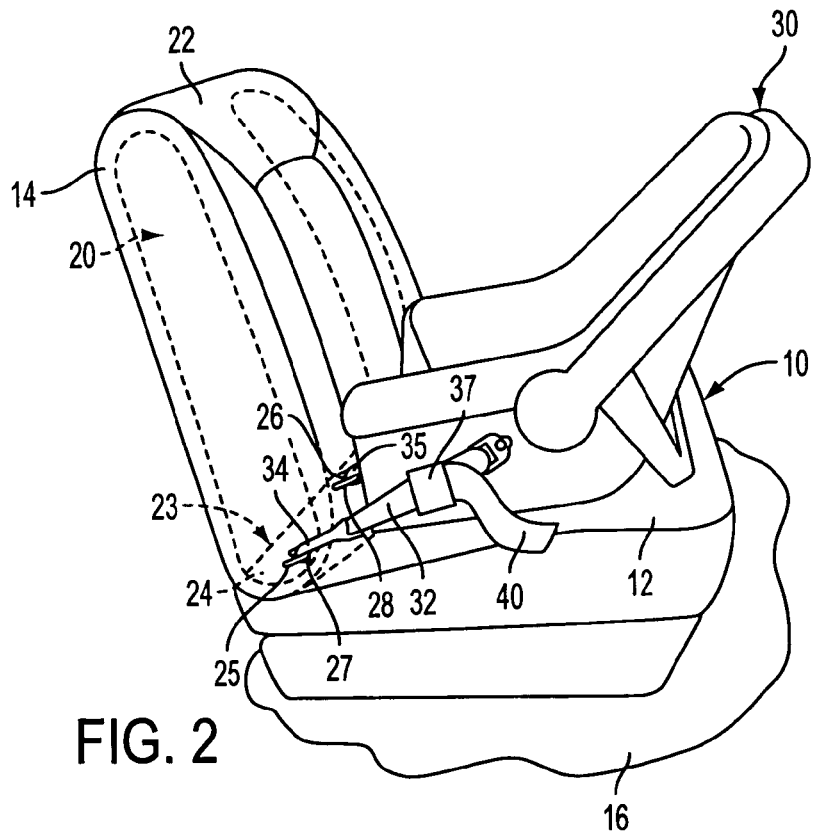
FIG. 2 is a side view showing a rearward facing child restraint seat being mounted on a vehicle seat in accordance with the principles of the present invention.

Referring now to FIGS. 1 and 2 there is shown a front vehicle seat 10 having a seat portion 12 and a back portion 14. The back portion 14 is cantilevered to the seat portion 12 and the seat portion is anchored to the floor 16 of the vehicle. The back portion 14 has a rigid frame 20 therein which is covered by padding and upholstery 22. Attached to the frame 20 is an anchorage 23 comprising cross bar 24 which has child restraint seat anchors 25 and 26 including anchor loops 27 and 28 attached thereto.

A child restraint seat 30 has a pair of straps 31 and 32 thereon with hooked couplers 34 and 35. The straps 31 and 32 have fittings 36 and 37 which allow the straps to be adjusted in length between the child restraint seat 30 and the hooked couplers 34 and 35 by pulling on ends 39 and 40 of the straps. Thus, when the child restraint seat 30 is attached by the hooked couplers 31 and 32 to the anchor loops 27 and 28 of the anchors 25 and 26, and the ends 39 and 40 of the straps 31 and 32 are pulled, tension is applied to the straps and thus to the anchors 25 and 26.

In the illustrated embodiment, the vehicle seat 10 is a right front passenger seat for American road vehicles or a left front passenger seat for vehicles such as UK road vehicles. The illustrated vehicle seat 10 is an existing seat configuration, however the principles of the present invention may apply to other seat configurations. Only if a vehicle's air bag is disabled should one consider mounting a child restraint seat 30 on the vehicle seat 10 facing rearwardly as shown in FIG. 2. The arrangement according to the present invention increases the likelihood that air bags are in fact disabled. If the child restraint seat 30 is facing forward, a tether 43 with a hook 45 is hooked into either an anchor on the back 14 of the vehicle seat 10 or fixed to the vehicle frame supporting the floor 16 at a location behind the seat anchors 25 and 26.

Figure 3:
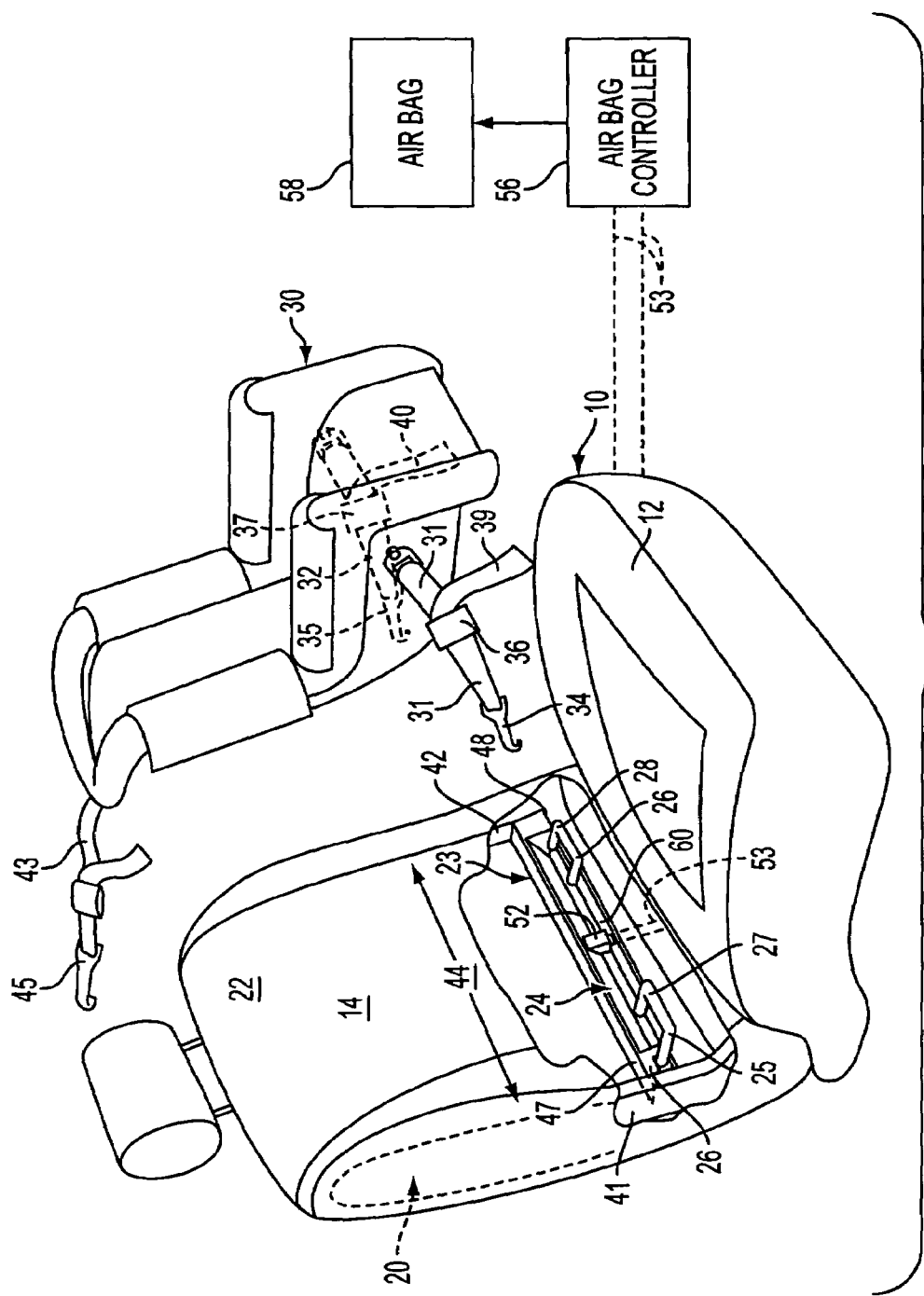
FIG. 3 is a perspective view of a front vehicle seat, modified in accordance with the principles of the present invention, to anchor the child restraint seats of FIGS. 1 and 2.

Referring now to FIG. 3, it is seen that the seat back frame 20 comprises vertical frame members 41 and 42, which are laterally spaced from one anther by a distance 44. In accordance with one embodiment of the present invention, the cross bar 24 of the anchorage 23 extends between the frame members 41 and 42 adjacent to the lower ends thereof and is welded at opposite ends 47 and 48 thereof to the frame members 41 and 42. The anchors 25 and 26 to which the hooked couplers 34 and 35 are attached via the anchor loops 27 and 28 are mounted on the cross bar 24 adjacent the opposite ends 47 and 48 thereof. In accordance with the present invention, as the straps 31 and 32 are tightened by pulling on the ends 39 and 40 of the straps, the anchors 25 and 26 move from a first position to a second position. If the straps 31 and 32 are of an effective length to begin with that applies tension to the anchors 25 and 26 when the hooked couplers 34 and 35 are attached, the straps need not be shortened.

The resulting movement of the anchors 25 and 26 is detected by a position sensor 52 which is operatively associated with the anchors. The position sensor 52 is connected by line 53 to an air bag controller circuit 56 that is switched to a disabling mode (or weight adjusting mode) which prevents the airbag or airbags 58 associated with the vehicle seat 10 from deploying either at all, or at full speed. The air bag 58 is a passenger seat air bag arrangement which may include a side curtain air bag. Upon securing the child restraint seat 30 to the vehicle seat 10, an automatic decision not to deploy is thus made independent of a passenger's weight. On the other hand, if the air bag controller circuit 56 decreases deployment speed for seat occupants of reduced weight, such as small children, then the signal from the load sensor 52 is used to adjust the weight measurement to compensate for the weight imposed by the attached child restraint seat 30.

Figure 4:
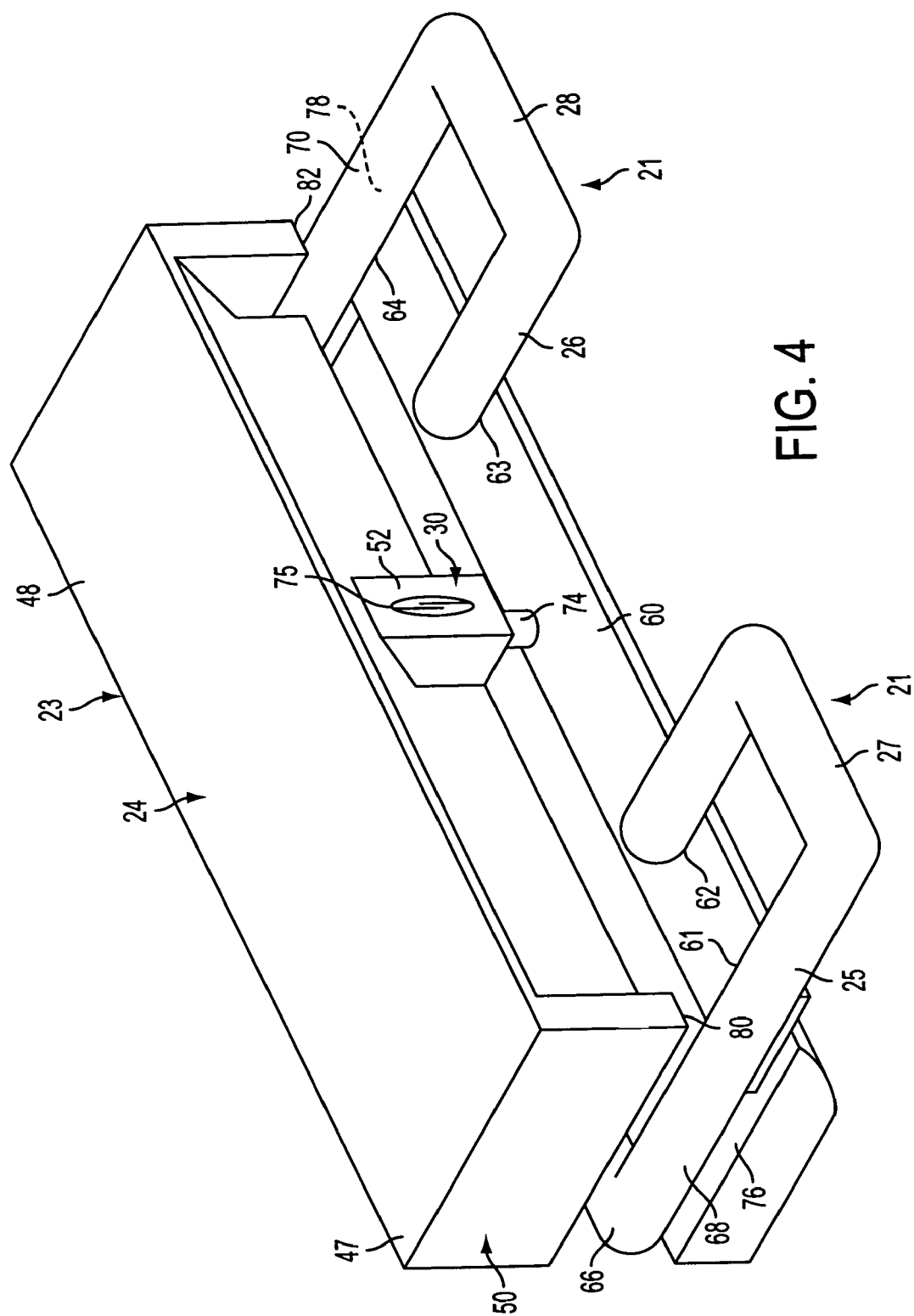
FIG. 4 is a front perspective view of a device for securing a child restraint seat to the vehicle seat of FIGS. 1–3.

Referring now to FIG. 4, there is shown a front perspective view of the cross bar 24 in isolation to which the anchor 25 is fixed by welds 61 and 62 and the anchor 26 is fixed by welds 63 and 64. The anchors 26 and 28 are connected to a rear bar 66 by arms 68 and 70, respectively. The rear bar 66 allows either pivoting or deflection of both the anchors 25 and 26 with respect to the cross bar 24 when the anchors 25 and 26 are tensioned by attaching the hooked couplings 34 and 35 (FIGS. 1 and 2) to the anchor loops 27 and 28. Since the child or infant restraining seat 30 is disposed above the anchors 25 and 26 (see FIGS. 1 and 2) torque with a tangential component is applied to the arms 68 and 70 to pivot the anchors 25 and 26 and the reaction plate 60 upwardly.

In accordance with an illustrated embodiment of the invention, a permanent magnet 74 is fixed to the reaction plate 60 while the position sensor 52 attached to the cross bar 24 includes a reed switch 75. As the permanent magnet 74 rises upon the anchors 25 and 26 pivoting with respect to the cross bar 24, the reeds within the reed switch 75 deflect into contact with one another generating an electrical signal. This electrical signal is applied over the line 53 (FIG. 3) to the air bag controller circuit 56 to disable the air bag 58 associated with the vehicle seat 10, so as to prevent the air bag from deploying or to slow speed of deployment. The reed switch 75 remains closed as long as the permanent magnet 74 is lifted into proximity with the reed switch. Upon the hooked couplers 34 and 35 being disconnected from the anchors 25 and 26, the permanent magnet 74 is lowered with respect to the reed switch 75 to move out of proximity with the reeds thereby opening the reed switch. This results in a signal being transmitted over the line 53 to the air bag controller circuit 56, again enabling deployment of the air bag or airbags 58 upon the occurrence of an accident.

Figure 5:
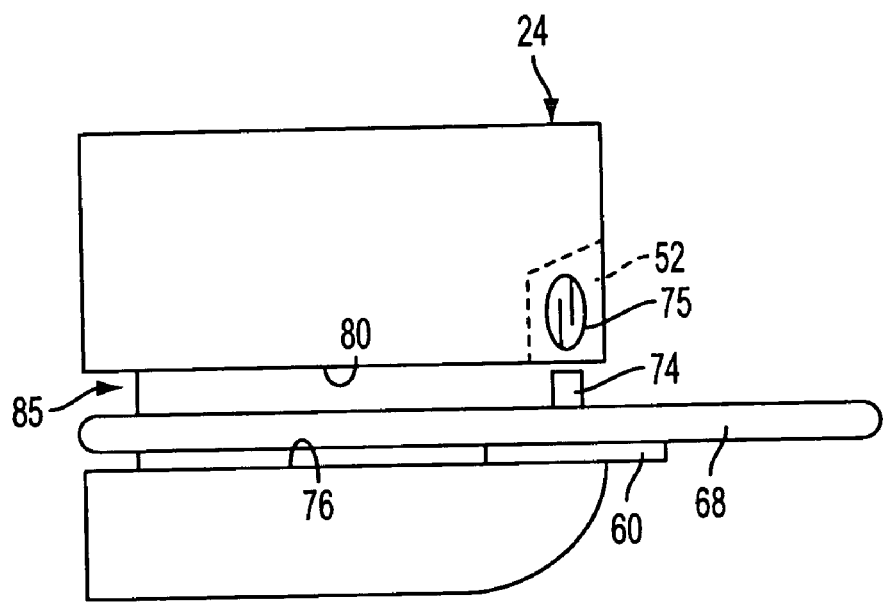
FIG. 5 is a side view showing an anchorage bar of FIG. 7 or FIG. 8 in a first position.

Referring now to FIG. 5 where a side view of the anchor bar 24 is shown, it is seen that the anchor plate 60 is in a first position wherein the anchor plate abuts lower surfaces 76 and 78 (see also FIG. 4) of the cross bar 24 so that the permanent magnet 74 on the anchor plate 60 is out of alignment with the reeds of the reed switch 75.

Figure 6:
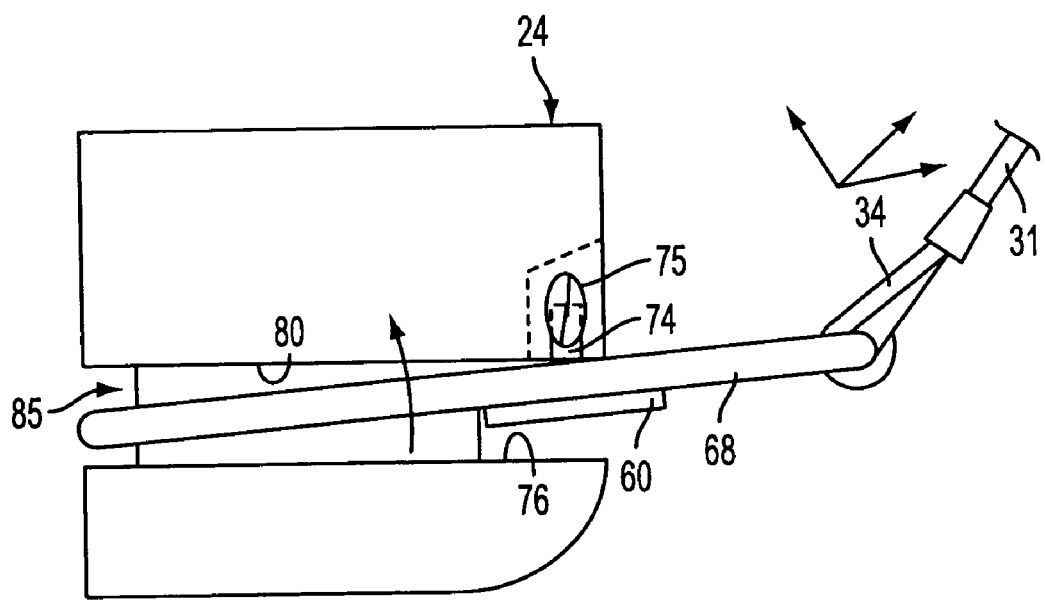
FIG. 6 is a side view showing the anchorage bar of FIG. 7 or FIG. 8a second position.

Referring now to FIG. 6, it is seen that the arms 68 and 70 have been rotated with their ends lifted so that the upper stop surfaces 80 and 82 (see also FIG. 4) of the cross bar 24 are engaged by the arms. Rotating the arms 68 and 70 the permanent magnet 74 into proximity with the reed switch 75 closes the switch 56 so as to disable or reduce the speed of air bag deployment. As is seen in FIG. 6, the tension applied by the hooked couplers 34 and 35 has a tangential component which causes the anchors 25 and 26 to rotate from the first position of FIG. 5 to the second position of FIG. 6.

Figure 7:
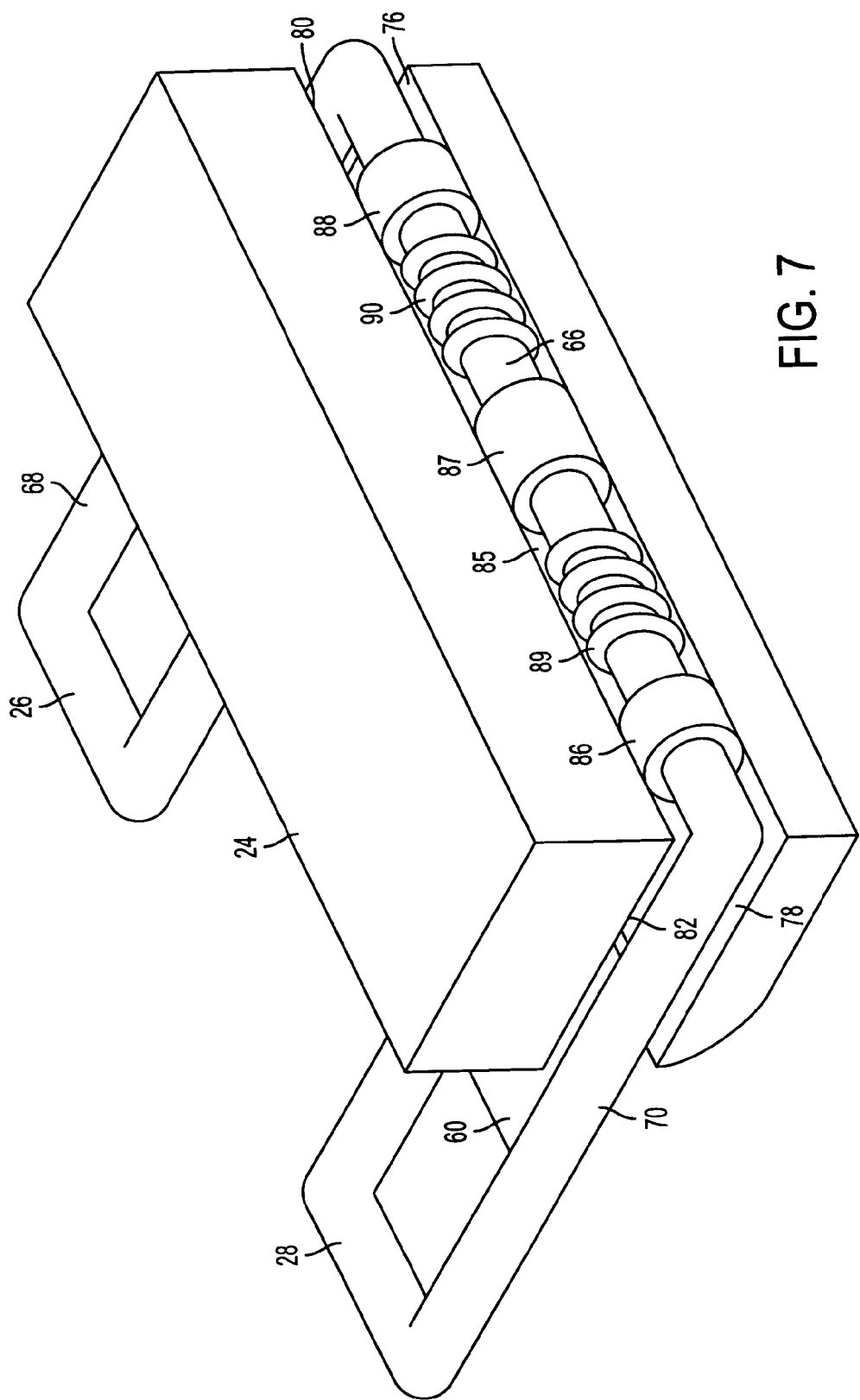
FIG. 7 is a back perspective view of a first embodiment of the device of FIG. 4.

Referring now to FIG. 7, there is shown a first embodiment for mounting the anchors 25 and 26 on the cross bar 24 of the anchorage 23 which extends between the side frame members 41 and 42 of the seat back 14 (see FIGS. 1 and 2). The arrangement of FIG. 7 is one of two preferred embodiments for mounting the anchors 25 and 26. In the arrangement of FIG. 7, a slot 85 in the cross bar 24 has three bearings 86, 87 and 88 disposed therein that allow the rear bar 66 to rotate with respect to the cross bar 24. Coil springs 89 and 90 each have one end attached to the cross bar 24 and the other end attached to the rear bar 66. The coil springs 89 and 90 bias the legs 70 and 68 down to the first position of FIG. 5. Upon applying a force to the anchors 25 and 26 by connecting the hooked couplers 34 and 35 thereto and pulling the straps 39 and 40 taught, the arms 68 and 70 have a tangential force component applied thereto which causes the rear bar 66 to rotate within the bearings 86–88 against the bias of the springs 89 and 90. This lifts the arms 68 and 70 to the FIG. 6 position, wherein the arms abut upper top surfaces 80 and 82 of the cross bar 24 so that the permanent magnet 74 closes the reeds in the reed switch 75 (FIG. 3). Upon releasing the hooked couplers 34 and 35 (see FIG. 3), the springs 89 and 90 return the anchors 25 and 26 to the FIG. 5 position in which the magnetic reed switch 75 is open.

Figure 8:
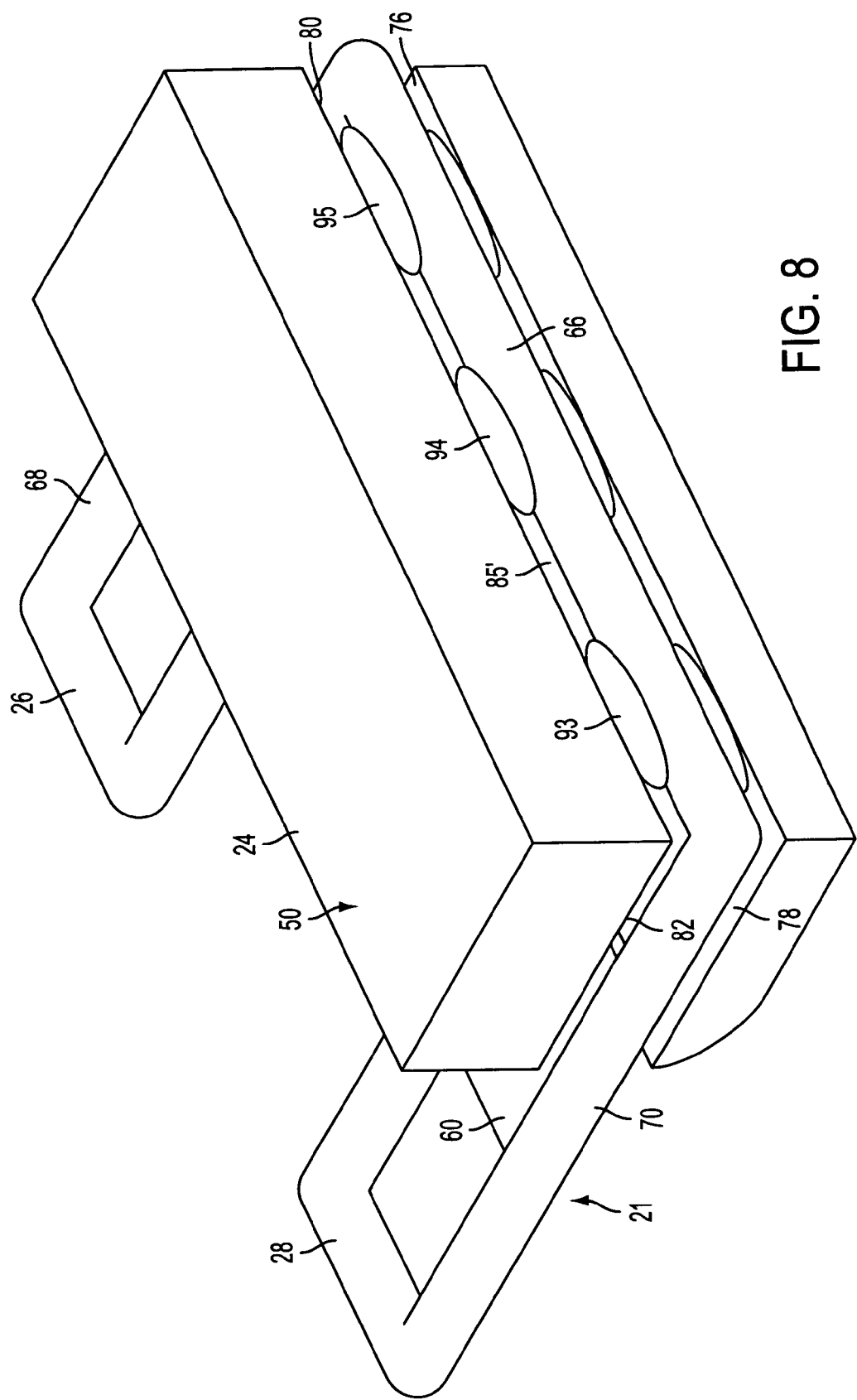
FIG. 8 is a back perspective view of a second embodiment of the device of FIG. 4.

Referring now to FIG. 8, there is shown a second preferred embodiment of the invention wherein rear bar 66' is welded within the slot 85' at three weld areas 93, 94 and 95 so that the bar 66 is rigidly retained to the cross bar 24. In the embodiment of FIG. 8, the legs 68 and 70 flex so as to deflect upwardly upon application of a tangential lifting force by the hooked couplers 34 and 35 applied to the anchors 26 and 28. The anchors 26 and 28 deflect upwardly until the legs 68 and 70 abut the upper surfaces 80 and 82 of cross bar 24, thus lifting the permanent magnet 74 into alignment with the reeds of the reed switch 75 (see FIGS. 3 and 5). Upon releasing the hooked couplers 34 and 35, the anchors 25 and 26 return to the position of FIG. 5 from which they had been deflected when the child restraint seat 30 was fastened to the vehicle seat 10.

While the anchors 26 and 28 are shown mounted on the cross bar 24 in accordance with preferred embodiments of the invention, the anchors in accordance with other embodiments of the invention are mounted directly to the side frames 41 and 42 of FIG. 2 and are connected by structure such as the bar 66 so as to act in concert in order to activate the switch 52.

While a reed switch 75 is disclosed, the position switch 52 in other embodiments can be an electro-mechanical contact switch, a resistive switch, a magnetic switch other than a reed switch, a strain gauge switch, a capacitive switch, or any other type of suitable switch.

From the foregoing description, one skilled in the art can easily ascertain the essential characteristics of this invention, and without departing form the spirit and scope thereof, can make various changes and modifications of the invention to adapt it to various usages and conditions.

We claim:

1. A device for detecting presence of a child restraint seat when the child restraint seat is attached to a vehicle seat, the device comprising:
   an anchorage having at least one coupler adapted to couple with a complementary coupler on the child restraint seat to retain the child restraint seat on the vehicle seat; the anchorage being movable with respect to the vehicle seat and being biased to a first position with respect to the vehicle seat, the first position being indicative of an absence of a child restraint seat attached to the anchorage, and
   a position sensor attached to the anchorage for detecting movement of the anchorage to a second position with respect to the seat, thereby indicating a child restraint seat is attached to the anchorage, the position sensor being adapted to transmit a signal to an air bag controller when moved to the second position;
   wherein the anchorage is biased to the first position by at least one spring and is pivotally mounted with respect to the seat and rotates from the first position to the second position.

2. The device of claim 1 wherein the vehicle seat includes a seat back frame, the anchorage being attached to the seat back frame by a cross bar adapted to be mounted between two vertically extending seat back frame members comprising the seat back frame.

3. The device of claim 2 wherein the anchorage comprises an anchorage bar extending along the cross bar and having two couplers at spaced locations thereon.

4. The device of claim 3 wherein the anchorage bar is resilient and is fixed to the cross bar at a portion of the anchorage bar, a second portion of the anchorage bar having the couplers thereon and being deflectable with respect to the first portion.

5. The device of claim 4 wherein the couplers are loops disposed adjacent to opposite ends of the anchorage bar.

6. The device of claim 5 wherein the cross bar has a load limiter surface thereon which engages the anchorage bar when the bar deflects to the second position.

7. The device of claim 6 wherein the position sensor is mounted on a plate extending between the loops that define the couplers.

8. A device for detecting presence of a child restraint seat when the child restraint seat is attached to a vehicle seat, the device comprising:
   an anchorage having at least one coupler adapted to couple with a complementary coupler on the child restraint seat to retain the child restraint seat on the vehicle seat; the anchorage being movable with respect to the vehicle seat and being biased to a first position with respect to the vehicle seat, the first position being indicative of an absence of a child restraint seat attached to the anchorage, and
   a position sensor attached to the anchorage for detecting movement of the anchorage to a second position with respect to the seat, thereby indicating a child restraint seat is attached to the anchorage, the position sensor being adapted to transmit a signal to an air bag controller when moved to the second position;
   wherein the vehicle seat includes a seat back frame, the anchorage being attached to the seat back frame by a cross bar adapted to be mounted between two vertically extending seat back frame members comprising the seat back frame;

wherein the anchorage comprises an anchorage bar extending along the cross bar and having two couplers at spaced locations thereon;

wherein the anchorage bar has a first portion pivotally mounted on the cross bar and wherein at least one spring is disposed between the anchorage bar and cross bar urging the anchorage bar to the first position.

9. The device of claim 8 wherein the couplers are loops disposed at opposite ends of the anchorage bar.

10. The device of claim 9 wherein the cross bar has a load limiter surface thereon which engages the anchorage bar when the bar deflects to the second position.

11. The device of claim 10 wherein the position sensor is mounted on a plate extending between the loops that define the couplers.

12. A device for detecting a presence of a child restraint seat when the child restraint seat is attached to a vehicle seat having a seat back frame that includes a pair of side frame members that are horizontally spaced from one another, the device comprising:

a cross bar having first and second ends, the first and second ends being fixed to the first and second side frame members, respectively, of the seat back frame;

an anchorage bar mounted on the cross bar and having first and second couplers thereon for coupling with couplers on the child restraint seat to retain the child restraint seat on the vehicle seat; the anchorage bar being movable with respect to the cross bar from a first position to a second position and being biased to the first position, wherein the anchorage bar has a first portion pivotally mounted on the cross bar and wherein at least one spring is disposed between the anchorage bar and cross bar for urging the anchorage bar to the first position; and a position sensor attached to the anchorage bar for detecting movement of the anchorage bar to the second position indicative of a child restraint seat being coupled to the anchorage bar, the position sensor being adapted to transmit a signal to an air bag controller when moved to the second position indicating the presence of the child restraint seat on the vehicle seat.

13. The device of claim 12 wherein the couplers are loops disposed at opposite ends of the anchorage bar.

14. The device of claim 13 wherein the cross bar has a load limiter surface thereon which engages the anchorage bar when the anchorage bar deflects to the second position.

15. The device of claim 14 wherein the position sensor is mounted on a plate extending between the loops that define the coupler.

16. The device of claim 12 wherein the anchorage bar is resilient and is fixed to the cross bar at a portion of the anchorage bar, a second portion of the anchorage bar having the couplers thereon and being deflectable with respect to the first portion.

* * * * *